March 24, 1970  C. MICHELSON  3,502,399
CINEMATOGRAPHIC FILM
Filed Oct. 4, 1966  3 Sheets-Sheet 1
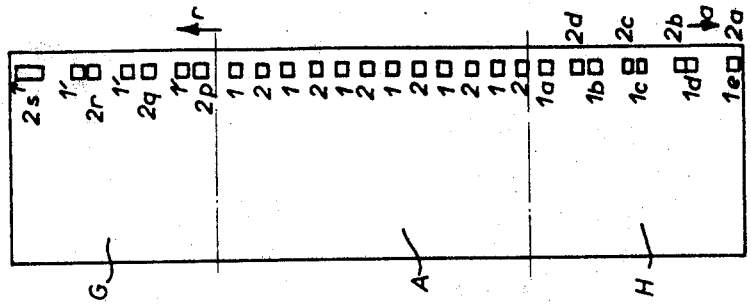
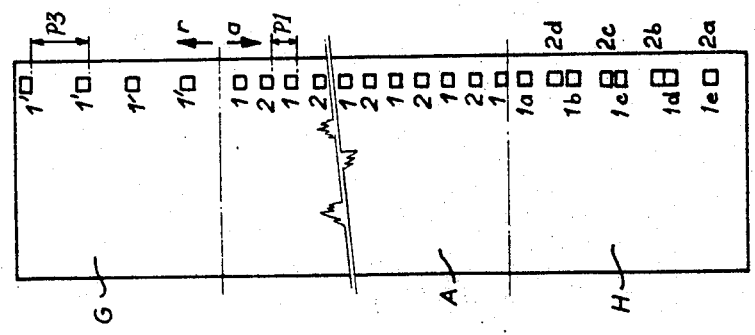
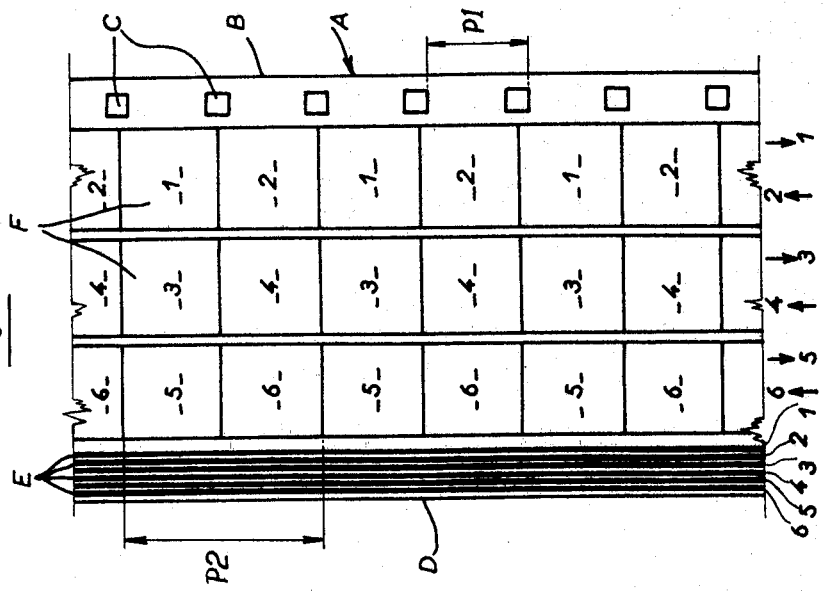

March 24, 1970   C. MICHELSON   3,502,399
CINEMATOGRAPHIC FILM
Filed Oct. 4, 1966   3 Sheets-Sheet 3
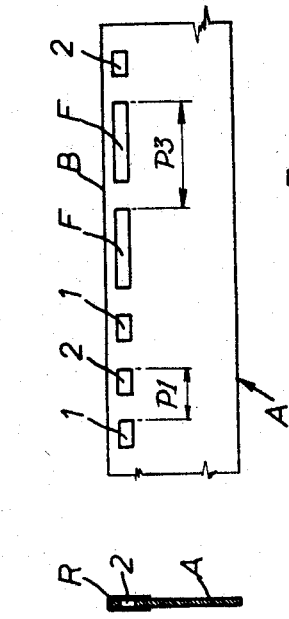
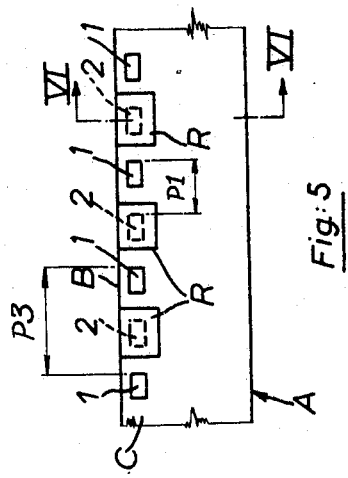
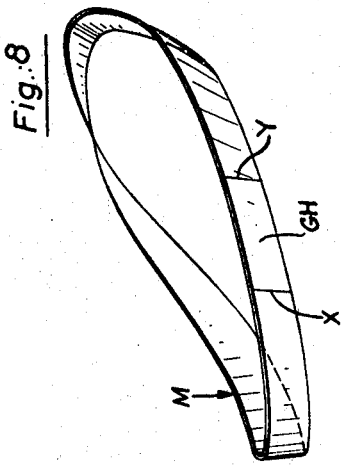

United States Patent Office 3,502,399
Patented Mar. 24, 1970

3,502,399
CINEMATOGRAPHIC FILM
Charles Michelson, Paris, France, assignor to Teverama S.A., Lausanne, Vaud, Switzerland, a company of Switzerland
Filed Oct. 4, 1966, Ser. No. 584,160
Claims priority, application France, Oct. 6, 1965, 33,956; Feb. 25, 1966, 51,219; May 3, 1966, 60,089
Int. Cl. G03b *31/00;* G03c *1/76*
U.S. Cl. 352—37          4 Claims

ABSTRACT OF THE DISCLOSURE

A cinematograph film for use in a movie projector having a conventional drive dog or claw, the film bearing one or more rows of intercalated images belonging to different sequences. The images to be successively projected are separated by an interval comprising at least one image of another sequence, and the film has, in addition to a conventional body portion perforated at a standard pitch or interval for engagement by the drive claw, at least one extension or end section having perforations differing in spacing from the standard pitch and so arranged that, under the action of the drive claw, the film is automatically shifted longitudinally through a distance equal to a sequence change shift.

---

This invention relates to a cinematographic sound film allowing as complete a utilization as possible of the film surface, namely by utilizing the film for the longest possible time with an acceptable quality as well for both the image projection and the sound reproduction. Such a sound film is moreover so designed that it may be used in a projector which is inexpensive, strong, easy to handle and provided with the various improvements of recently introduced devices.

The film according to the invention is of the kind comprising one or more rows of interlocked images belonging to different sequences, the images to be successively projected being separated by an interval comprising at least one image of another sequence, the number of the sound tracks being equal to that of the image sequences of the film. The films of this kind may be reciprocated, each movement in either direction corresponding to a sequence of images. In a modification they may be in the form of an endless band which is driven in one direction only and performs as many complete closed circuits as it comprises image sequences.

Of course, the problem arises in either case of shifting the position of the film with respect to an optical projection system so as to shift from the images of one sequence to those of the following one, either when the direction of travel of the film is reversed in the first case or at the end of a complete closed circuit of the endless band in the second case. Several solutions have been proposed to bring about this shifting by operating manually or automatically suitable parts of the projector or, in the case of an endless band, by adopting a given law relating the total number of images to that of the image sequences.

This invention gives a solution which differs from the former ones in that it is reached by slightly altering the film and allows, by this alteration only, an automatic shifting without it being necessary to specially design the projector to this end.

According to the invention, the film has an extension constituting a dephasing strip where the perforations are provided at intervals differing from their normal pitch or spacing, so that after a number of such perforations have been engaged by the conventional drive dog or claw of the projector, a dephasing strip amounting to the length of one or more images has taken place with respect to the normal travel for the projection of successive images.

In an application of the invention, the film is characterized by the one-side (that is, along one edge only) provision of a single row of perforations having the standard spacing of either 3.81 or 4.234 (4.25) mm. on a film of the standard 16 mm. format, the images and the sound tracks being arranged in the space extending to the other side of the film.

In a modification, the film has two lateral rows of perforations near both its opposite edges, these perforations being alternating or staggered, that is, the perforations of one row are shifted with respect to those of the other row. This mutual shifting of the perforations of the two rows is preferably equal to half the spacing or interval between the successive perforations.

It is quite evident that the procedure which naturally occurs to one's mind is to connect to one end of the cinematograph film an extension taken from another film having a suitable perforation spacing, for instance twice that of the cinematograph film.

However, a piece of a suitable film the perforations of which would present this double spacing is not always available to the operator, in which case he must do with the cinematograph film itself by adapting it to the use mentioned above.

According to a mode of carrying out the present invention he will operate as follows in order that the correct perforations be engaged in view of correctly positioning the images relative to the desired sequence.

The "correct" perforations having been identified, the other ones are blocked by means of a piece of adhesive tape widely extending around the undesirable perforation without however reaching the useful one. The adhesive tape may be arranged on one side of the film only or be folded up so as to cover both sides of the film at the desired place.

This solution has the drawback of locally increasing the thickness of the film and it is desirable to utilize a very thin adhesive tape and even possibly to reduce the thickness of the film at the sticking place by conventional scratching methods.

In a modification, the adhesive tape and the application of any material on the film may be dispensed with by carving out the same lengthwise between the useful perforations so as to remove the narrow band which extends from the last useful to the first undesirable perforation. There is thus obtained a slot connecting these two perforations, so that when the film is utilized in the projector the claw, whose travel is slightly longer than the interval between two perforations, will fall upon the proper edge of the "correct" perforation and keep the same position even when the film has become normal again.

Of course in both above embodiments, the alteration of the film will be limited to a very short length thereof. Theoretically its application to one perforation should be sufficient. Its repetition on several near or remote perforations gives an additional security.

Of course the above blocking or carving out may be performed at both ends of the film so as to provide a correct positioning in both the forward and the return movement.

In the appended drawing:
FIGURE 1 shows a known film to which the invention is applicable;
FIGURES 2 and 3 diagrammatically show dephasing strips according to the invention;
FIGURE 4 shows a modification of the film;
FIGURE 5 is a partial diagrammatical view of a film end designed according to a first embodiment of a film according to the invention;
FIGURE 6 is a cross section along line VI—VI of FIGURE 5;

FIGURE 7 shows a modification of the film according to the invention;

FIGURE 8 illustrates the application of the invention to a Moebius band.

Figure 4:
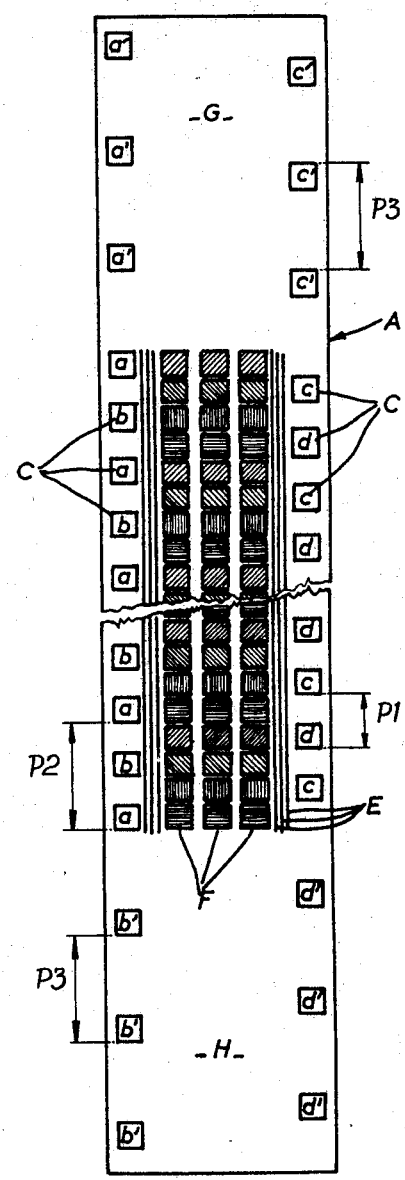

The film A shown in FIGURE 1 has the standard 16 mm. format and comprises, near one edge B of its two edges, a single row of perforations C separated from one another by the standard 3.81 or 4.25 mm. spacing or pitch P1 (which is the perforation pitch of standard 8 mm. films).

Near the opposite edge D are provided juxtaposed optical sound tracks E, numbering six in the example of the drawing.

This number is also that of the sequences of successive images F distributed over three rows in the space comprised between the perforations, so that the image frames are also at the perforation pitch P1 C and the sound tracks E. Each row comprises one image per perforation. The images of the rows are interlocked and belong to two sequences of images which succeed each other in one direction for one of the sequences and in the opposite direction for the other sequence, as shown by the arrows which indicate the successive directions in which the film travels to and fro through the picture projector. Thus, in each row, every other image belongs to a same sequence as indicated by the same reference numeral, and the consecutive images of each sequence are at a pitch P2 which is twice that of the juxtaposed image frames, i.e. $P2=2.P1$.

The film loading device will therefore comprise two spools which will be alternately filled and emptied a number of times equal to that of the sequences of images imprinted on the film. The forward travel corresponds to one sequence and the return travel to the following one. One of these spools may be integral with the projector, the film being automatically guided toward this spool.

If the above described film is compared with a conventional film of the same 16 mm. format having two lateral rows of perforations with the standard 7.62 mm. spacing, it can be seen that the film according to the invention contains six images in the space occupied by one image of the conventional film. It can also be seen that one of the two rows of perforations of the conventional film no longer exists in the film according to the invention and that there is instead an additional perforation inserted between two successive perforations of the remaining row or, in other words, the spacing of the perforations is reduced by one half.

Of course, according to known devices, the sound pick-up shifts from one track E to the following after the forward and after the return travel of the film, whereas the optical image system and the film are shifted laterally relatively to each other after one complete reciprocation travel so as to allow the shifting from one row to the following one.

It is however also necessary to provide a means for reversing the direction of passage of the film when shifting from one sequence of images to another in the same row, that is, in the example of FIGURE 1, for shifting from the images 1 to the images 2, or from the images 3 to the images 4 or from the images 5 to the images 6.

According to the present invention end strips shown schematically at G and H in FIGURE 2 are specially dsigned for this sequence shifting purpose and form longitudinal extensions of the film body portion A.

In the chosen example, the film comprises two sequences of images designated 1 and 2 respectively, the corresponding perforations being designated likewise.

In order that in the forward direction (direction of arrow $a$) the projection of the images 1 may be independent of the initial setting of the film, it is sufficient that a starting strip G of the film presents perforations 1' with a pitch P3 twice as large as the pitch P1 of the perforations of the body of the film A and in "phase" with the succession of these perforations which corresponds with the images 1.

At the end of the projection of the images 1 there is provided a dephasing strip H so designed that when the direction is reversed for the return travel (arrow $r$) the images 2 necessarily register with the projection window. It appears indeed that the perforations 1a, 1b, 1c, 1d, 1e, are closer to each other, namely have a spacing slightly less than that of the perforations 1 of the body of the film A, so that past a number of perforations in the section H (five in the example shown) the value of one whole interval between two perforations in the body of the film A has been "lost" or, in other words, a shifting of one interval and phasing with the perforations 2 of film A have taken place. Of course it would be possible to proceed in the opposite manner and to "gain" a whole interval by providing between the perforations 1a, 1b, etc., an interval slightly greater than that between the perforations 1 of the body of film A, the final result of a one interval phase shifting and of phasing with the perforations 2 being reached in a similar manner.

Thus, after reversal of the travelling direction, the claw which engages the perforation 1e, also designated 2a, will engage backwards the perforations 2b, 2c, 2d, and exactly engage the first perforation of the body of the film A which corresponds to the images 2.

Of course, instead of effecting the whole necessary dephasing at the end of the forward travel (arrow $a$) by means of the perforations 1a . . . 1e only, this dephasing could also be effected for example for one half over each of the two forward and return directions (arrows $a$ and $r$) or alternatively the whole dephasing could be concentrated over the beginning of the return travel (arrow $r$), in which case the perforations 1a . . . 1e would be normally spaced, whereas the perforations 2a . . . would be either closer to each other or spaced wider apart.

However that may be, the dephasing strip, owing only to the action of its adequately distributed perforations, brings about the progressive shifting of the film forwards or backwards so as to allow the shift of the image sequences at the reversal of the travelling direction. This operation corresponds to a "black" of the projection the duration of which can be less than one second.

FIGURE 2 corresponds to the simplest case of a film with one row of interlocked images belonging to two sequences only, so that in operation one forward and one return travel only is necessary, the necessary dephasing taking place at the reversal of the travelling direction.

If however the film comprises several rows of images, as in the example of FIGURE 1, or if it is desired to automatically revert to a correct position for a new projection in the forward direction $a$, the upper strip G must be devised in a way similar to the lower strip H. Such a disposition is shown in FIGURE 3, where the last perforation in the direction $r$ at the upper portion of the body of film A is followed, in the dephasing strip G, by perforations 2p, 2q, 2r, 2s the intervals of which are increasing until a perforation merges in a perforation 1'. It should be noted that when the travelling direction is reversed the driving claw engages the proper edge of the perforation without any special precaution being necessary to cause the claw then to engage the perforations of the required sequence.

This procedure is of course applicable to the case where more than two image sequences are interlocked, necessitating as many travels in either direction. Indeed, a progressive shifting of the perforations provided in the film sections allows the shifting of the perforations driven by the claw during the travel of the images. It is thus possible to obtain a shift of 1, 2, 3, 4, etc. perforations at both ends of the film.

In order that all the image sequences (numbering $n$) may be used, the shifts $d$ cannot have any value whatsoever. They must obey the following laws ($d_1$=shift over the film beginning strip H, $d_2$=shift over the film end strip G).

(1) Dephasing in the same direction and with the same amplitude over both film strips ($d_1=d_2$).

It is necessary and sufficient that (a) $d_1=d_2=1$ or that
(b) $d_1=d_2=$ a number incommensurable with $n$ For example, for $n=8$, $d_1=d_2=1$ or $d_1=d_2=3$.

(2) Dephasing having different amplitudes over the two film strips ($d_1 \neq d_2$).

(a) It is necessary that the sum of the successive shifts $d_1+d_2+d_1$, etc. does not reach the number $n$ of image sequences before a number of shifts equal to $n$ has taken place.

EXAMPLE I $n=8$, $d_1=1$, $d_2=3$. After 4 shifts $d_1+d_2+d_1+d_2=8$, which means that four series only out of eight have been utilized.

EXAMPLE II $n=8$, $d_1=1$, $d_2=5$. The successive shifts are:

$1+5+1+5+1=13\equiv 5$
$1+5+1+5+1+5=18\equiv 2$
$1+5+1+5+1+5+1=19\equiv 3$
$1+5+1+5+1+5+1+5=24\equiv 8$
$1+5+1+5+1+5+1+5+1=25\equiv 1$ The origin is again reached after 8 shifts and the series of images are projected in the order:

1, 6, 7, 4, 5, 2, 3, 8

It should be observed that a forward shift of 5 is equivalent to a backward shift of 3: $d_2=5$ or $d_2=-3$ are equivalent (for $n=8$).

(b) It is necessary and sufficient that the sum of the successive shifts: $d_1$, $d_1+d_2$, $d_1+d_2+d_1$, etc. is not equal to a shift already utilized before a number of shifts equal to the number of image sequences has been reached.

The above example meets this condition. The following combination ratio $n=8$, $d_1=2$, $d_2=3$, is not suitable because after four shifts ($2+3+2+3=10\equiv 2$) the already used two image shift, is again reached.

In the modification according to FIG. 4 the interlocked images belong to four different sequences differentiated by the directions of the hatchings. Taking into account that conventionally a sound track corresponds to each sequence there is a total of twelve sound tracks, which may be distributed in groups of three (only two groups being illustrated instead of four for simplification) on the right and on the left side of the film.

The newly marketed emulsions allow a reduction in image dimensions and an improvement of the acoustical quality of the sound tracks. Now, if it is possible, the other conditions remaining unchanged, to double the number of images, it is materially impossible, on account of the lack of room, to reduce by one half the spacing of the perforations, which is already that of the 8 mm. film, namely 3.81 or 4.25 mm.

This is the reason why two series of perforations, one on the right, the other on the left side of the film are utilized, care being taken to stagger one of these series with respect to the other by a height equal to a half interval. To the left perforations $a$ correspond for instance the images occupying positions Nos. 1, 5, 9, 13 . . . and to the other left perforations $b$ the images occupying positions Nos. 3, 7, 11, 15 . . . Again, the images occupying positions Nos. 2, 6, 10, 14 . . . and 4, 8, 12, 16 . . . correspond to the right perforations $c$ and $d$ respectively.

In order to allow the utilisation of such sequences, extensions or sections similar to those described are provided at G and H at the ends of the film, these sections having perforations $a'$, $b'$, $c'$, $d'$, the spacing of which is twice that of the film perforations, with suitable shifts. Of course, since the right and left perforations C are staggered, a similar stagger applies to the perforations of the sections G and H.

It is of course possible to apply the invention to endless Moebius bands such as M (FIGURE 8), a dephasage strip GH being inserted, at the proper location, between the beginning X and the end Y of the film.

In the dephasing strips G and H of FIGURE 4 as well as in the starting strip G of FIGURE 2, it is recalled that the perforation pitch P3 is twice that, P1 of the film body portion A or, in other words, one perforation out of two is omitted.

This result can be obtained by blocking every other perforation, as shown in FIGURE 5, with a piece R of adhesive tape which extends over and around the perforation to be omitted (say, perforation 2) and may be applied on one side only of the film or folded up over both sides as shown by FIG. 6.

In the modification of FIG. 7 the film is carved out so as to connect two successive perforations 1, 2, by providing a slot F which forms a kind of elongated perforation. Since only the forward end edge (with respect to the direction of travel) of the perforation is engaged by the claw, it will be seen that the desired shift is thus automatically obtained.

What I claim is:

1. A cinematograph film having a main body portion comprising:
  at least one longitudinal row of intercalated images (F) belonging to at least two sequences with the consecutive images of each sequence being at a constant image pitch (P2); and
  a first pattern of successive, longitudinally aligned perforations (C) along one edge of said film at a constant perforation pitch (P1), which is a submultiple of said image pitch (P2);
  a plurality of sound tracks (E) along the opposite edge of said film from said perforations, one sound track corresponding to each image sequence;
  wherein the improvement comprises:
  at least one sequence-shifting strip (G, H), forming a longitudinal extension of said main body portion (A) at an end thereof and having a second pattern of successive perforations longitudinally aligned with the perforations of said first pattern and at a pitch equal to said image pitch.

2. A film as claimed in claim 1, wherein the ratio of said pattern perforation pitch (P3) to said first pattern perforation pitch (P1) is equal to 2.

3. Film as claimed in claim 1, wherein said main body portion has two close-set ends (X, Y) and said sequence shifting strip (G, H) is provided between said ends and interconnects the same, whereby said film forms an endless band.

4. Film as claimed in claim 3, wherein said endless band has an inside-out turn and forms a Moebius band (M).

References Cited

UNITED STATES PATENTS

| | | | |
|---|---|---|---|
| 1,499,941 | 7/1924 | Marette | 352—241 |
| 2,624,232 | 1/1953 | Kingston | 352—236 |
| 3,053,140 | 9/1962 | Brogan et al. | 352—72 |
| 1,485,907 | 3/1924 | Brown | 352—239 |
| 1,698,106 | 1/1929 | Owens | 352—173 |
| 2,483,040 | 9/1949 | Mazzaoui | 352—239 X |
| 2,590,956 | 4/1952 | Gille | 352—239 X |

FOREIGN PATENTS 38,559 12/1923 Norway.

NORTON ANSHER, Primary Examiner

MONROE H. HAYES, Assistant Examiner

U.S. Cl. X.R.

352—239, 241